May 26, 1942.  D. R. DE BOARD  2,284,375
BLASTING CABLE REEL
Filed May 6, 1941   2 Sheets-Sheet 1
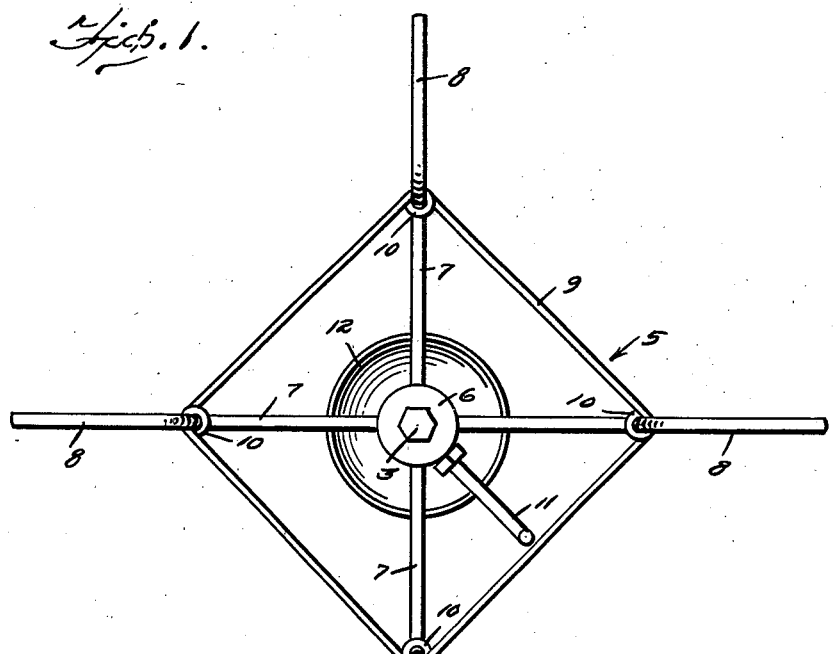
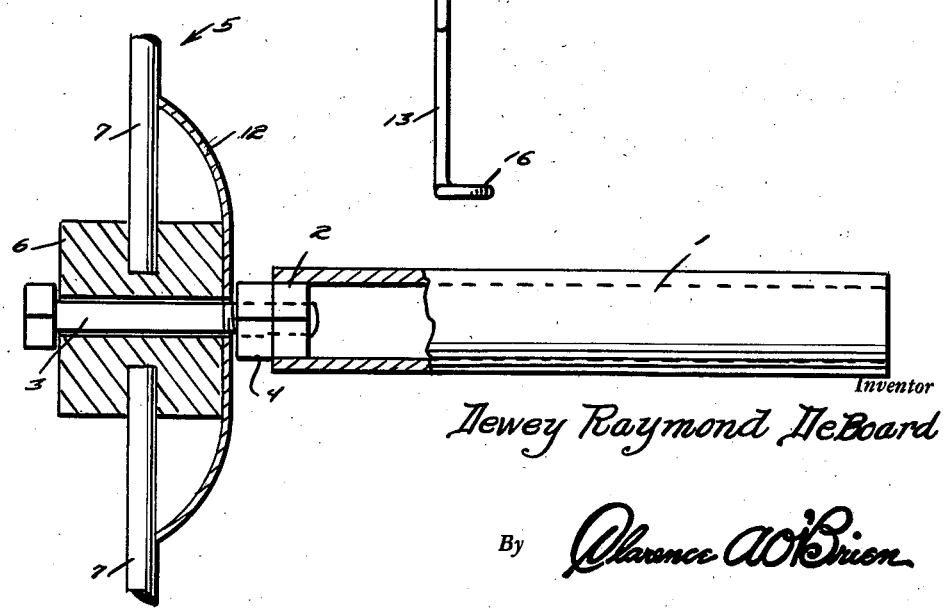
Inventor
Dewey Raymond DeBoard
By Clarence A. O'Brien
Attorney

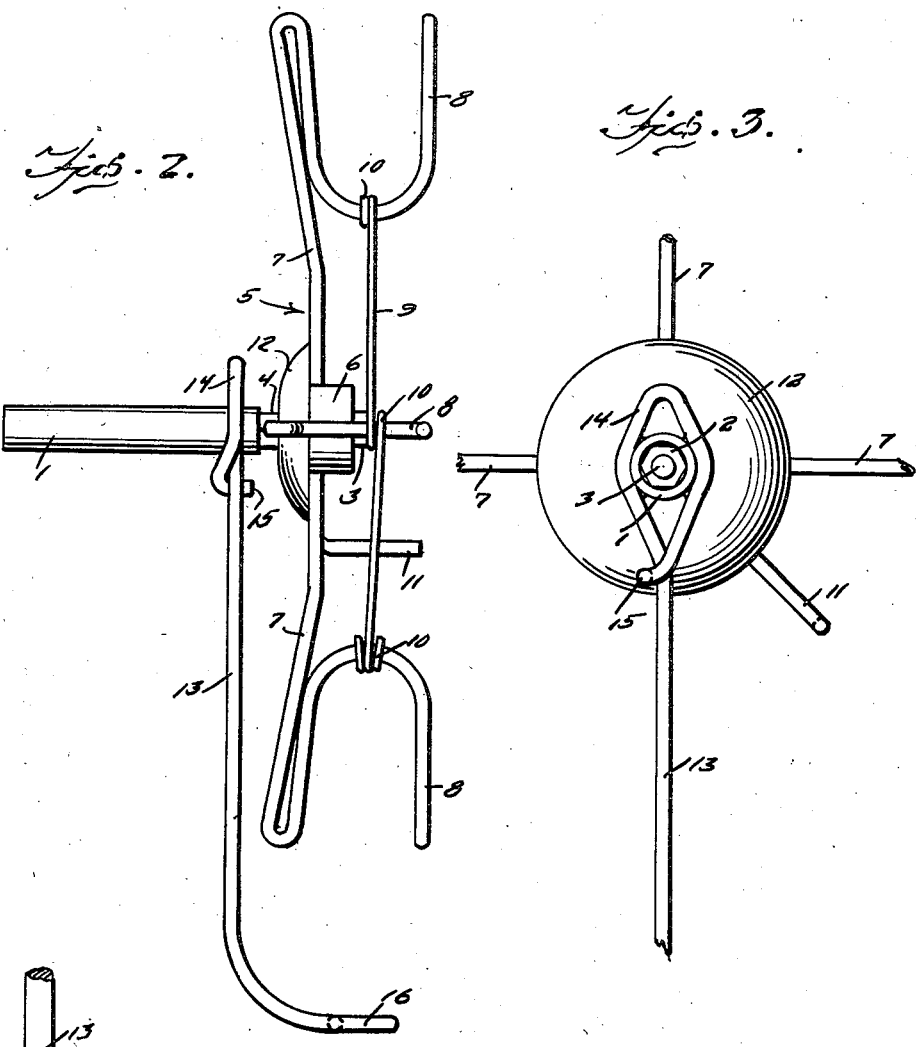

Patented May 26, 1942

2,284,375

UNITED STATES PATENT OFFICE 2,284,375

BLASTING CABLE REEL

Dewey Raymond De Board, MacDunn, W. Va., assignor of one-half to James W. O'Dell, MacDunn, W. Va.

Application May 6, 1941, Serial No. 392,150

1 Claim. (Cl. 242—99)

The present invention relates to new and useful improvements in blasting cable reels for use particularly in mines and has for its primary object to provide, in a manner as hereinafter set forth, a device of this character which is adapted to be conveniently carried and operated by hand.

Another very important object of the invention is to provide a reel of the aforementioned character which includes unique means for manually braking and controlling the rotation of the device.

Other objects of the invention are to provide a blasting cable reel of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a reel constructed in accordance with the present invention.

Figure 2 is a top plan view of the device.

Figure 3 is a fragmentary view in side elevation, illustrating the method of securing the cable guide to the handle.

Figure 4 is a view principally in vertical section through the central portion of the device.

Figure 5 is a perspective view of the outer end portion of the guide.

Referring now to the drawings in detail, it will be seen that the embodiment of the invention which has been illustrated comprises a tubular handle 1 of suitable material. Fixed in one end portion of the handle 1 is a plug 2. Threaded into the plug 2 is a stud bolt constituting a headed spindle 3. A lock nut 4 secures the spindle 3 against loosening in the plug 2.

Journaled on the spindle 3 is a reel which is designated generally by the reference numeral 5. The reel 5 includes a hub 6 of suitable material which is rotatably mounted on the spindle 3. Anchored in the hub 6 and radiating therefrom is a plurality of angular arms 7. The outer portions of the arms 7 are bent upon themselves and formed to provide substantially U-shaped members or saddles 8 for the reception of a blasting cable. A wire brace 9 connects the substantially U-shaped saddles 8 and is looped around the bight portions thereof, as at 10, for strengthening the reel structure.

A hand crank 11 is fixed on the hub 6 for manually rotating the reel 5. Loosely mounted on the spindle 3, between the hub 6 and the lock nut 4, is a disk 12 of suitable material. The disk 12 is frictionally engageable with the hub 6 for manually controlling or regulating the rotation of the reel 5.

Mounted on the handle 1 adjacent the reel 5 is a guide 13. The guide 13 is formed from a single rod of suitable metal which extends at right angles to the handle 1. One end portion of the guide 13 is bent to provide a substantially diamond shaped loop 14 which is clamped on the handle 1 and which terminates, at one end, in a hook 15 which is engaged with said guide. At its outer end the guide 13 terminates in a right angularly extending eye 16 for the passage of the blasting cable.

It is thought that the operation of the device will be readily apparent from a consideration of the foregoing. Briefly, the handle 1 is held in one hand and the other hand grips the crank 11. Thus, the blasting cable may be conveniently wound on or unwound from the reel 5. Of course, the reel 5 is manually rotated for winding the blasting cable thereon through the medium of the hand crank 11. When unwinding the blasting cable the rotation of the reel 5 may be controlled as desired by pressing the disk 12 against the hub 6 with the thumb of the hand which grips the handle 1. The disk 12, in addition to serving as a brake, also functions as a guard for preventing the hand which grips the handle 1 from being injured by the arms 7.

It is believed that the many advantages of a blasting cable reel constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A blasting cable reel of the character described comprising a handle, a plug fixed to one end portion of said handle, a spindle threadedly mounted in said plug and projecting longitudinally from the handle, a reel rotatably mounted on the spindle, said reel including a hub journaled on said spindle, a plurality of arms radiating from the hub, cable receiving means on the outer ends of said arms, and a disk loosely mounted on the spindle, said disk being frictionally engageable with one end of the hub for manually controlling the rotation of the reel and being of concave form and larger in diameter than said end of the hub to arch over said end and function as a guard preventing contact of the hand with said end of the hub.

DEWEY RAYMOND DE BOARD.